US009399279B2

(12) United States Patent
Breith et al.

(10) Patent No.: US 9,399,279 B2

(45) Date of Patent: Jul. 26, 2016

(54) DOUBLE-SIDE DRESSER

(71) Applicant: Liebherr-Verzahntechnik GmbH, Kempten (DE)

(72) Inventors: Thomas Breith, Kempten (DE); Manfred Zankl, Oberguenzburg (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 0 days.

(21) Appl. No.: 14/321,650

(22) Filed: Jul. 1, 2014

(65) Prior Publication Data

US 2015/0011142 A1 Jan. 8, 2015

(30) Foreign Application Priority Data

Jul. 2, 2013 (DE) ........................ 10 2013 011 048

(51) Int. Cl.

| | |
|---|---|
| ***B24B 53/075*** | (2006.01) |
| ***B24B 53/06*** | (2006.01) |
| ***B23F 23/12*** | (2006.01) |
| ***B23F 21/00*** | (2006.01) |
| ***B23F 21/02*** | (2006.01) |

(52) U.S. Cl.

CPC ............. *B24B 53/075* (2013.01); *B23F 21/005* (2013.01); *B23F 21/026* (2013.01); *B23F 23/1225* (2013.01); *B24B 53/062* (2013.01)

(58) Field of Classification Search

CPC .. B24B 53/075; B24B 54/062; B24B 53/017; B24B 53/12; B24B 37/04; B24B 27/0076; B24B 27/0023; B24B 5/24

See application file for complete search history.

(56) References Cited

U.S. PATENT DOCUMENTS

| | | | | |
|---|---|---|---|---|
| 3,339,537 | A * | 9/1967 | Stade .................... | B24B 53/075 125/11.07 |
| 3,568,654 | A * | 3/1971 | Palmer .................. | B24B 53/075 125/11.05 |
| 2009/0227182 | A1* | 9/2009 | Breith ................. | B23F 23/1225 451/5 |
| 2012/0309271 | A1* | 12/2012 | Geiser ................. | B23F 23/1225 451/47 |
| 2014/0308877 | A1* | 10/2014 | Weppelmann .......... | B23F 17/00 451/5 |

FOREIGN PATENT DOCUMENTS

| | | | | |
|---|---|---|---|---|
| CH | 197368 | | 4/1938 | |
| DE | 3433044 | A1 | 4/1985 | |
| DE | 225364 | A1 | 7/1985 | |
| DE | 297357 | A5 | 1/1992 | |
| DE | 19624842 | A1 | 1/1998 | |
| DE | 102004020364 | A1 | 1/2006 | |
| DE | 102007022603 | A1 | 11/2008 | |
| DE | 102011120449 | A1 | 6/2013 | |
| EP | 0328482 | A2 | 8/1989 | |
| WO | WO 2007000831 | A1 * | 1/2007 | ............. B23F 13/04 |

OTHER PUBLICATIONS

German Patent and Trademark Office, Examination Report of DE102013011048.3, Mar. 28, 2014, 12 pages.

* cited by examiner

*Primary Examiner* — Dung Van Nguyen

(74) *Attorney, Agent, or Firm* — Alleman Hall McCoy Russell & Tuttle LLP

(57) ABSTRACT

The present disclosure relates to an apparatus and to a method for dressing generating grinding tools or profile grinding tools for the gear cutting processing of toothed workpieces using at least two disk-shaped dressing tools with which one or more tool regions and/or profile regions of the tool are provided with a defined dressing geometry.

9 Claims, 4 Drawing Sheets

DOUBLE-SIDE DRESSER

CROSS REFERENCE TO RELATED APPLICATION

This application claims priority to German Patent Application No. 10 2013 011 048.3 entitled "Double-Side Dresser," filed Jul. 2, 2013, which is hereby incorporated by reference in its entirety for all purposes.

TECHNICAL FIELD

The present disclosure relates to an apparatus and to a method for dressing generating grinding tools or profile grinding tools for the gear cutting processing of toothed workpieces using at least two disk-shaped dressing tools with which one or more tool regions and/or profile regions of the tool are provided with a defined dressing geometry.

BACKGROUND AND SUMMARY

Gear grinding machines are used in the manufacture of gears for the hard fine processing of preprocessed gears to give the latter their final geometry. As a rule, in this respect teeth are first shaped from a rotationally symmetrical workpiece, e.g. by cutting or shaping, in a soft preprocessing step in the manufacture of gears. The workpiece preprocessed in this manner is thereupon subjected to a heat treatment by which at least the regions of the gear disposed in the proximity of the surface of the teeth are hardened. To compensate the changes in the surface geometry which occur in the heat treatment and to produce the surface geometry of the teeth with greater precision, the hard fine processing takes place on the gear grinding machine. In this respect, a grinding wheel and/or a worm grinding wheel is used with which the workpiece is processed and which gives it its final geometry.

To adapt the grinding wheels or worm grinding wheels to the desired geometry of the gear and/or to compensate the wear of a grinding wheel and/or worm grinding wheel, the grinding wheel or worm grinding wheel have to be dressed to set a new geometry of the workpiece at regular intervals during operation. The dressing or profiling of a grinding wheel and/or worm grinding wheel in this respect comprises the actual profiling, i.e. the generating of the required geometry of the grinding wheel and/or worm grinding wheel (true running, cylindrical form, profile) and the honing, i.e. the generating of a grinding surface easy to cut (microgeometry). In practice, however, the term dress is often used for the generation of a geometry and the restoration of a grinding surface easy to cut.

In this respect and depending on the required conditions such as the dressing unit, the type of tool (worm wheel, wheel) or the required profile corrections, different profiling tools are used for the profiling of grinding wheels and worm grinding wheels. In this respect, a distinction is likewise made whether the total profile (profile dressing) or only part regions (shape dressing) thereof are dressed.

In shape dressing, the dressing wheel is moved along the surface of the tool in a manner controlled in a track and in so doing dresses the grinding tool. There is a limited contact between the dressing tool and the grinding tool. When dressing worm grinding wheels, a plurality of dressing strokes is therefore necessary between which the dressing tool is advance by a specific amount so that the total surface of the grinding tool is dressed. The dressing process is thereby very flexible with respect to modifications, but requires a fairly long time since always only small regions of the tool are dressed simultaneously.

In profile dressing, the dressing process is much faster since always the total profile is dressed. There is a linear contact via the total profile height of the grinding tool. Changes to the profile are thus only possible via a change at the dressing tool. The profiling time is in this respect very short since one or both flanks of a spiral are dressed to completion with one dressing stroke of the grinding tool depending on whether dressing takes place at one flank or at both flanks. If necessary, the profile flanks can be profiled differently from one another and variably over the spiral width to generate a so-called three-dimensionally modified worm grinding wheel.

In part, the tooth crest and the tooth flanks are also separately dressed during profile dressing. There are then special flank dressing wheels and head dressing wheels for this purpose.

If now the processes of head dressing and profile dressing are to be carried out with different frequencies or also if a plurality of different gear teeth having different profiles are to be processed with one grinding tool in a working process, a plurality of dressing tools have to be present in the machine simultaneously. However, they must be assembled such that the do not mutually influence one another. This also has to be ensured when the dressing tool is to be pivoted inward differently to modify the angle of engagement of the gear teeth.

Known apparatus for dressing grinding tools always have either only one tool receiver or the tool receivers are located close to one another in axial alignment and thus mutually influence one another.

In the corporate document of Fässler DSA, a diamond wheel apparatus is disclosed as a double-side dresser having two motors, for the respective independent drive of two diamond dressing wheels. The end faces of the tool receivers of the two dressing motors face one another in this respect. The tool receivers are provided for receiving diamond wheels with which the respective one flank of a worm grinding wheel is dressed. This type of dressing wheels is shown in the representation of FIG. 2, tool 8*b*. The state of engagement of the dressing wheels with the worm grinding wheel is shown at the top in this Figure. There are in part embodiments in which one of these wheels is supplemented by a special dressing roller for the tooth crest of the worm grinding wheel, as is also shown in FIG. 2, tool 8*c*, right hand wheel.

A unitary, galvanically coated tool having two different areas is disclosed in WO 94/19135. These two areas are coated with hard substances to take over different grindings work during the hard fine processing process. The grinding tool has a conical receiver sleeve with which it is pulled onto a tool base arbor and is tightened. A tool in this embodiment can also be configured such that workpieces having two different gear teeth in accordance with the present disclosure can be processed with it. This tool is, however, not flexibly adaptable to the processing work due to the galvanic coating as would be the case with a dressable tool.

DE 10 2004 020 364 A1 describes a tool for generation grinding of gear teeth having a multipart grinding tool with dressable grinding bodies. A multipart tool is described here in which different grinding bodies are clamped on a common base arbor. The different types of abrasive wheels in this application each serve to carry out the roughing process and smoothing process in the grinding of gear teeth with a grinding coating optimized therefor and thus to obtain a machining process which is as optimum as possible. The use for different gear teeth is not mentioned.

Different combination dressing tools for the profile dressing of worm grinding wheels are shown in EP0328482A1. The tools are in this respect designed such that parts of the tool surface are utilized as a functional surface for dressing certain part areas of the grinding tool. With the disclosed two-part tool, the flanks of a worm are dressed using a dressing wheel, whereas a second tool serves the dressing of the tooth crest and the tooth base of the grinding tool.

The spacing of the two tools has to be set exactly to the gear teeth if both dressing tools are in engagement since otherwise the gear grinding wheel is damaged. Only the crest dresser can be moved via a cross-slide perpendicular to the tool axis and in the axial direction of the dresser. The crest and base dresser can thus only be used in addition to the flank dresser. A dresser of two different gear teeth is not possible with this arrangement.

The dressing tool such as DE 196 24 842 A1 discloses serves the processing of part areas of a grinding tool. The flanks of the grinding tool are dressed in a linear contact using the flanks of the dressing tool. The head of the dressing tool serves the shape dressing of part areas of a grinding tool. The disadvantage of this embodiment is that two different gear tooth arrangements can only be dressed with limitations using this tool.

Modern transmissions also contain, in addition to the classical gears with a bore ("bore workpieces"), input shafts, intermediate shafts and output shafts which have one or more gear tooth arrangements which are directly connected to the shaft or come from a raw material. The gear tooth geometry of the gear tooth arrangement on a component can differ in this connection with respect to the module, crest/base rounding portions, profile spheres, number of teeth and other factors, which has the result that the two different gear tooth arrangements cannot be processed with one and the same worm gear wheel or grinding wheel. In accordance with the prior art, such gear tooth arrangements are currently frequently processed with galvanically coated grinding tools on a machine or the workpieces are processed in two mutually following processing operations on the use of dressable tools.

If these gear tooth arrangements should be able to be processed to complete on one machine in a processing operation for economic reasons and because tools from dressable cutting materials can be reprofiled more easily, at least two dressing tool are thus required for this purpose in order thus to dress a respective worm grinding wheel/grinding wheel or a respective worm grinding wheel area.

The fact is disadvantageous for all embodiments for dressing wheels shown above that always only the tool for processing a gear can be dressed. With the exception of a shaping dressing wheel such as is shown in FIG. 2, 8*a* the other dressing wheels are matched to the gear geometry of the workpieces to be processed. Almost any desired grinding wheels or worm grinding wheels can be processed using a dressing wheel in accordance with FIG. 2, tool 8*a*, provided the geometry of the dressing wheel allows it. However, the time needed for the dressing cycle is disadvantageous in this respect since always only a part area of the grinding tool can be processed simultaneously. This is not the case or is only the case with limitations with the profile dressers of FIGS. 2, 8*b* to 8*c*.

If now a grinding tool for processing a workpiece having a plurality of gear tooth arrangements, which differ clearly geometrically (e.g. module, tip or root relief, profile spherical shapes, optionally number of teeth, etc.), is to be dressed the use of two respective different dressing wheels is necessary if it is not desirable to process the tool in a line dressing process.

The outer diameter of these dressing tools typically only differs in a minimal manner, however. If such dressing wheels are to be used, this cannot take place using a dressing apparatus in accordance with the prior art, having two mutually oppositely disposed dressing tools, since otherwise a collision of the worm grinding wheel with the respective dressing tool just not being used would occur on the dressing of the worm grinding wheels. For this reason, the dressing unit has to be configured such that the dressing wheels can be brought into engagement with the grinding tool after one another without collision.

This object is achieved by a dressing device and tool arrangement having the features of a dressing unit which is suitable to receive at least two different dressing tools and to bring them into engagement with a respective associated grinding tool or grinding tool area independently of one another in the dressing process without the dressing processes/dressing tools mutually influencing one another in so doing.

An arrangement of the dressing tools such as described in the Fässler DSA dresser is not suitable for this application. If the dressing wheels differ only minimally in diameter, collisions between the just dressed grinding tool and the other currently not used dresser would occur over and over again on the dressing of worm gear wheels. The above-described collisions would also occur on the receiving of a plurality of dressing tools on one receiving arbor. For this reason, the dressing tool receivers must be considerably further remote from one another in location.

In an embodiment, the two tool mounts for the dressing tools can be arranged above one another so that first a grinding tool is dressed using the lower dressing tool and subsequently a second grinding tool is dressing by the upper dressing tool.

In this connection, a dressing tool is also understood as a combination dressing tool for the simultaneous dressing of the tooth crest and tooth flanks such as is shown, e.g. in FIGS. 2, 8*c* and 8*d*. Such a dressing unit could be arranged on the counterholder of a grinding machine in accordance with the prior art as is shown in FIG. 1. Other installation locations are, however, also conceivable which can be traveled to by the processing head and/or the dressing device and at which the grinding tools can be brought into engagement with the dressing tools.

At least one of these receivers for the dressing tool is made pivotable about an axis which is at an angle of 10° to 90° to the dressing tool axis so that changes can thus be carried out e.g., at the angle of engagement of a worm grinding wheel.

The at least two tool receivers can be driven in a controlled manner independently of one another about the tool axis to set the dressing tool into a rotational movement.

The grinding tools can be dressed considerably more flexibly with the aid of this present disclosure. Furthermore, dressable tools for manufacturing two different gear tooth arrangements on a grinding machine can likewise be dressed faster since it is not necessary to make use of the slow shape dressing/line dressing. An economic and flexible production using dressable grinding tools is thus also possible for these workpieces.

Alternatively, the dressing unit can, however, also be used when the flanks of the grinding tool and the head should be dressed using different tools at different intervals. A combination tool such as in FIG. 2, 8*c*, 8*d*, is then no longer possible. The dressing tool for the tool flanks and the head dresser then have to be configured separately so that these tools can also be used separately.

In the correction of a grinding tool, frequently only small areas such as tip reliefs, root reliefs, changes to the root rounding portion or of the profile angle are modified with respect to the standard profile. In this embodiment, a shape dresser can be combined with a profile dresser. With this tool combination, the total profile of the tool can then first be dressed using the profile dresser in an optimized process time and subsequently small profile areas such as the tooth root or the tooth crest can then still be modified line-wise using the shape dresser with the shape dressing process. A very flexible dressing with a short dressing time can be realized by this combination.

A combination tool comprising at least one worm grinding wheel and at least one grinding wheel or one grinding wheel set tool would then likewise be dressable using this dressing unit, for the grinding wheel is frequently shape-dressed and a profile dresser is used for the worm grinding wheel. These combination grinding tools can likewise be dressed fast and flexibly by the mutually independent tool receivers.

This combination then also opens up further new possibilities such as a combination of gear processing with an external cylindrical grinding operation or also a processing combination of outer gear teeth and inner gear teeth when the processing head offers this possibility.

This dressing unit furthermore includes a dressable grinding tool comprising one or two gear worm grinding wheels, a combination of a worm gear grinding wheel and a grinding wheel or of two grinding wheels or grinding wheel set tools. Depending on the individual case, the respective ideally matching combination can in this respect be selected for the respective processing case.

The present disclosure furthermore comprises control software for a gear grinding machine, in particular control software stored in a data memory or on a data carrier and having non-transitory program code for carrying out a process such as was described above. The advantages in accordance with the present disclosure hereby in turn result. The control software in this respect advantageously has the corresponding operating modes or operator guidance.

The present disclosure furthermore comprises the use of a gear grinding machine for carrying out a method such as was described above. The advantages which were already presented with respect to the method hereby again result.

The present disclosure furthermore comprises the use of a dressing tool for carrying out a method such as was described above. The present disclosure thus in particular comprises the use of a dressing tool for dressing a grinding tool on a gear grinding machine as well as the use of a grinding tool which is dressed on a gear grinding machine.

Further features, details and advantages of the present disclosure will be explained with reference to embodiments shown schematically in the drawing.

DETAILED DESCRIPTION

Figure 1:
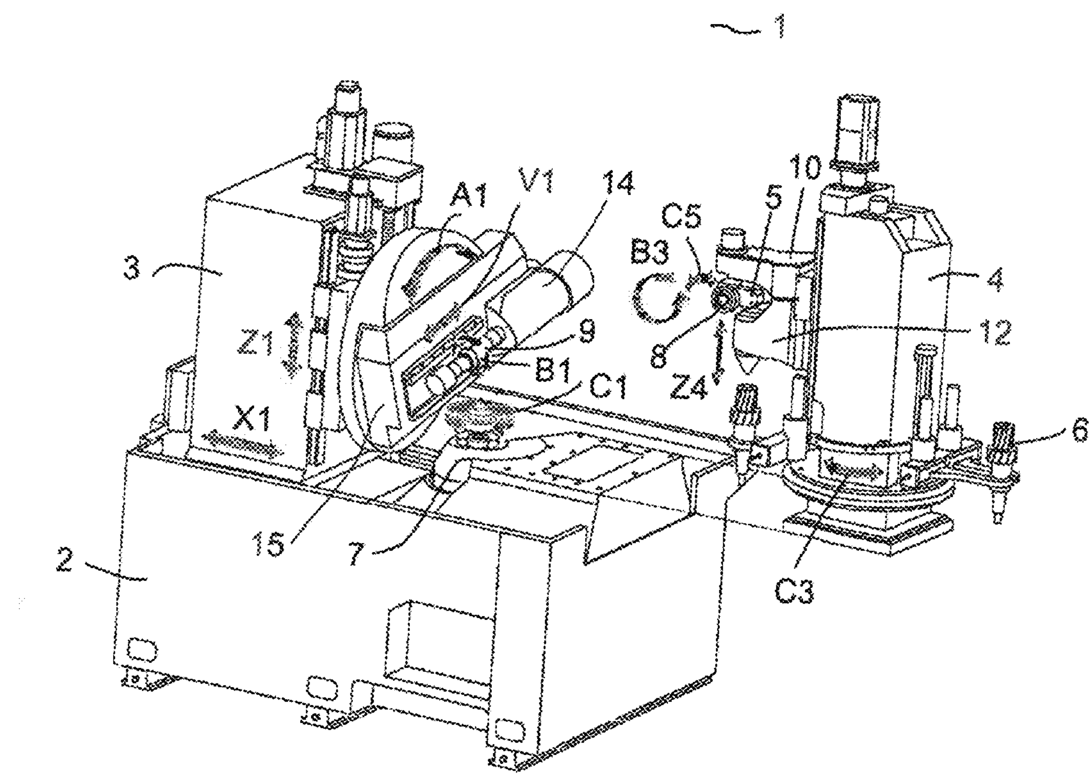
FIG. 1 shows a gear grinding machine in accordance with the prior art.

FIG. 1 shows a gear grinding machine 1 in accordance with the prior art on which, for example, a dressing apparatus in accordance with the present disclosure can be used. A machine table 7 which is provided for receiving workpieces 6 via a clamping apparatus (not shown) is mounted on a machine bed 2. The machine table 7 is in this respect rotatable about the axis C1 which is advantageously aligned perpendicular. Alternatively, however, horizontally aligned machine tables can also be used. The gear grinding machine furthermore has a machine stand 3 and a processing head 15 having a work spindle 14 for clamping a tool receiver 9. A counter-stand 4 is mounted opposite the machine stand 3 on the machine bed 2. A loading system having a pivot axis C3 is located on the counter-stand 3 and conveys the workpiece 6 from an external automated unit (not shown) to the machine table 7 or into the clamping apparatus mounted on the machine table. A counter-holder arm 12 is movable vertically via a Z4 axis and parallel to the C1 axis at the counter-stand. A dressing unit 10 is fastened to the counter-holder arm. The dressing tool 8 can be moved about an axis of rotation B3 and about a pivot axis C5.

The processing head 15 is moved with the tool via the X1 axis toward a workpiece for the hard fine processing of the workpiece. During the workpiece processing, the C1 axis and the B1 axis rotate in a synchronized manner, i.e. roller-coupled with one another, while the processing head moves in the Z1 direction and, as required, in the X1, V1 direction. The processing of the workpiece with the grinding wheel or the worm grinding wheel in this respect typically takes place by generating grinding or profile grinding or a combination thereof.

In the dressing process, the processing head 15 is moved toward the dressing tool 8 via the X1 axis and the Z1axis in this embodiment and is there brought into engagement with the dressing tool 8. Depending on the type of dressing program and of the processing tool, the processing head 15 is moved with the processing tool via the X1 axis, Z1 axis, V1 axis and A1 axis relative to the dressing tool 8, while the processing tool rotates about the B1 axis. The dressing tool 8 itself in this respect rotates about its B3 axis and is, as desired, pivoted about the C5 axis in dependence on the selected dressing program.

Figure 2:
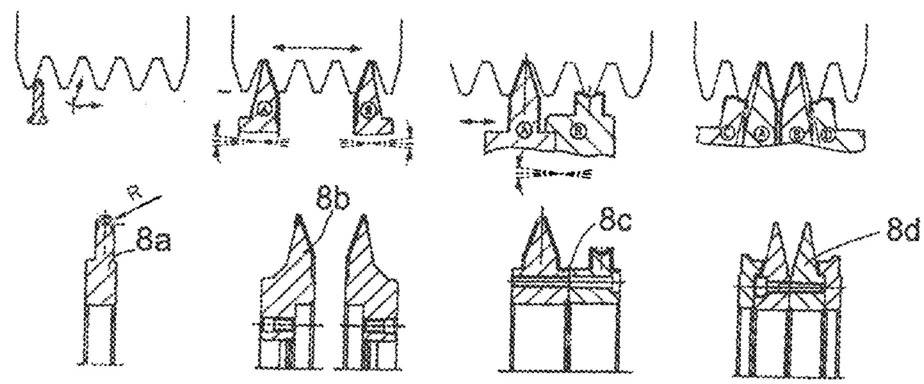
FIG. 2 shows dressing tools in accordance with the prior art.

FIG. 2 shows by way of example different types of dressing tools and profiling tools 8*a* to 8*d* for the shape dressing and profile dressing of grinding tools in accordance with the prior art. A shape dresser 8*a* is typically used for the dressing of grinding wheels or worm grinding wheels in which the dressing wheel is guided with its radius R along the outer contour of the grinding wheel or worm grinding wheel while the two tools rotate. This is frequently called line dressing. In the other dressers shown the tool is dressed over its total profile height in a dressing process, with this being able to take place on one flank (FIGS. 8*b*, 8*c*) or both flanks (FIG. 8*d*). The dressing unit in accordance with the present disclosure is predominantly provided for the use of dressers in accordance with FIGS. 8*c* and 8*d* since both tooth flanks of a grinding tool can be dressed using one dressing wheel.

Figure 3:
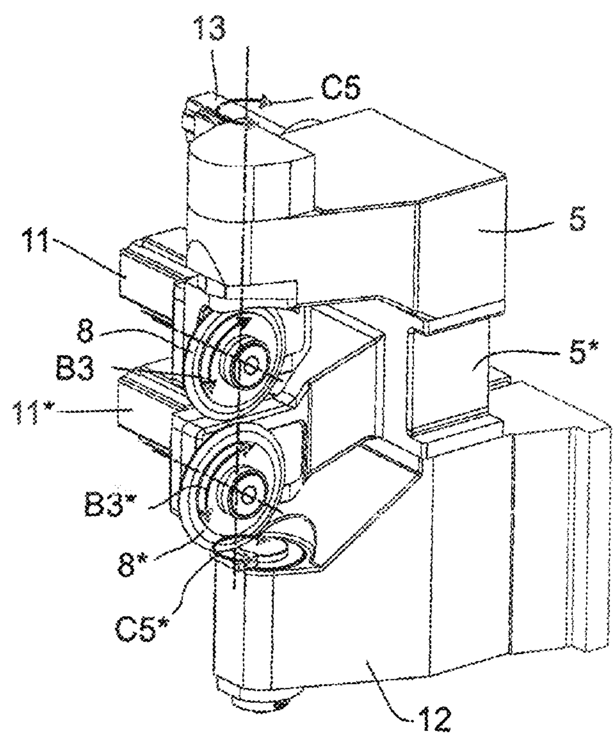
FIG. 3 shows a double side dresser (apparatus) in accordance with the present disclosure.

FIG. 3 shows a dresser 5, 5* in accordance with the present disclosure, e.g. for arrangement on the counter-holder arm 12 at the counter-stand 4 of a gear grinding machine. The two dressing units 5, 5* are arranged above one another. The dressing tools 8, 8* are driven by the two motors 11, 11* which rotate the tool about the B3 axis, B3* axis. The dressing tools can be rotated about the C5 axis, C5* axis via two further motors 13 (only one shown).

Figure 4:
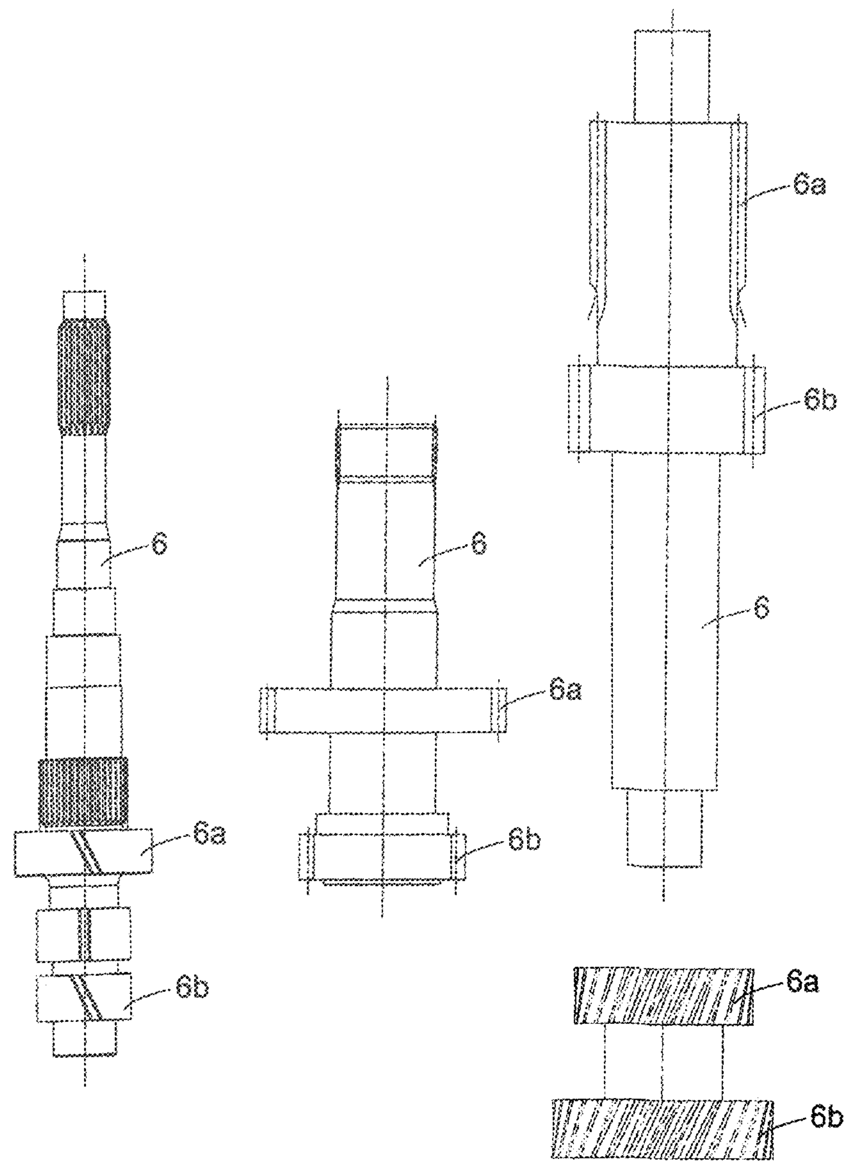
FIG. 4 shows exemplary workpieces for using the method in accordance with the present disclosure.

FIG. 4 shows possible embodiments of workpieces which have at least two different gear tooth arrangements having different gear tooth geometries 6*a*, 6*b*. These geometries can differ in dimensions such as module, root and tip rounded portions, profile spherical portions, optionally different numbers of teeth and other gear tooth arrangement modifications which prevent the two gear tooth arrangements from being able to be processed by one grinding tool and thus require the use of at least two tools.

Figure 5A:
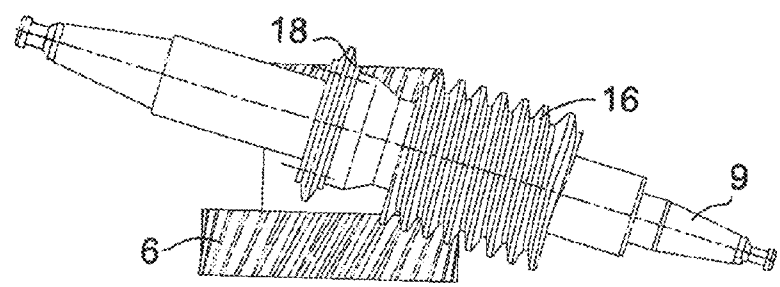
FIG. 5*a* shows exemplary combination grinding tools, worm wheel/wheel in accordance with the present disclosure.
Figure 5B:
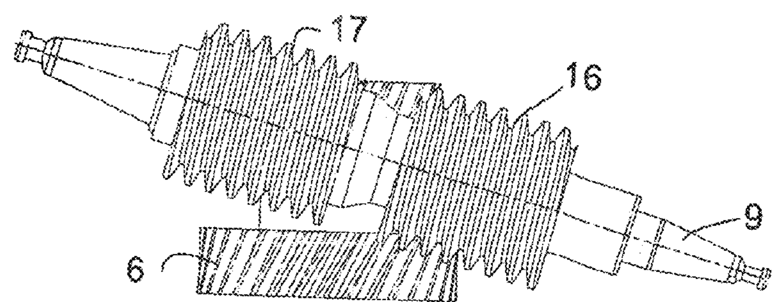
FIG. 5*b* shows exemplary grinding tools, worm wheel/worm wheel in accordance with the present disclosure. The figures are drawn to scale, although other relative dimensions may be used.

FIGS. 5*a* and 5*b* show by way of example a possible design of a grinding tool 9 such as can be used in accordance with the present disclosure. In this respect, FIG. 5*a* shows a combination tool for generating grinding and profile grinding. Depending on the quality demand, number of teeth, gear tooth width and further possible factors, the user is able with this tool arrangement to bring the optimal tool properties of a worm grinding wheel 16 or of a grinding wheel 18 into use for the process design. A plurality of worm gear wheels 16, 17 and/or of grinding wheels 18 can naturally also be combined with one another. A purely generating grinding tool for processing at least two gear tooth arrangements having different gear tooth geometry is shown in FIG. 5*b*. A tool in which only a plurality of grinding wheels or grinding wheel sets are mounted is not shown. It is common to all of them that different grinding tools for processing different gear tooth geometries are mounted on a tool receiver or on a tool arbor.

For example, in one example, an apparatus for dressing generating grinding tools or profile grinding tools comprises a dressing unit having at least two tool receivers for receiving at least two disk-shaped dressing tools, wherein the tool receivers are arranged and positioned such that the dressing tools are each only individually brought into engagement with the grinding tool without mutually influencing one another. The at least two tool receivers may be driven independently of one another, with each driven directly by its own motor drive.

The invention claimed is:

1. An apparatus for dressing generating grinding tools or profile grinding tools comprising:

a dressing unit having at least two tool receivers for receiving at least two different disk-shaped dressing tools, wherein the tool receivers are arranged such that the dressing tools are individually and/or independently brought into engagement with the grinding tool without mutually influencing one another, wherein at least one of the two tool receivers has a driven pivot axle by which the tool is pivotable about an axis which is at an angle of 10° to 90° toward the tool axis, wherein the at least two driven tool receivers are provided for receiving dressing tools and/or profiling tools having a different gear tooth geometry, and wherein the at least two driven tool receivers are shaped and positioned for receiving dressing tools and/or profiling tools for dressing different profile areas of the grinding tool.

2. The apparatus in accordance with claim 1, wherein the at least two tool receivers are driven independently of one another.

3. The apparatus in accordance with claim 2, wherein the at least two driven tool receivers are provided for receiving dressing tools and/or profiling tools having different diameters.

4. The apparatus in accordance with claim 2, wherein the at least two driven tool receivers are shaped and positioned for receiving dressing tools and/or profiling tools for dressing different grinding tools such as grinding wheels and worm grinding wheels.

5. The apparatus in accordance with claim 2, wherein the at least two driven tool receivers are shaped and positioned for receiving dressing tools and/or profiling tools for carrying out different dressing processes such as shape dressing and profile dressing.

6. A dressable grinding tool for processing workpieces, the grinding tool is processed by at least two dressing tools which are mounted on an apparatus for dressing generating grinding tools or profile grinding tools comprising a dressing unit having at least two tool receivers for receiving at least two disk-shaped dressing tools, wherein the tool receivers are arranged such that the dressing tools are individually brought into engagement with the grinding tool without mutually influencing one another, the at least two dressing tools mounted on the apparatus to provide tool areas and/or profile areas of the tool having a defined dressing geometry, wherein at least one of the two tool receivers has a driven pivot axle by which the tool is pivotable about an axis which is at an angle of 10° to 90° toward the tool axis, wherein the at least two driven tool receivers are provided for receiving dressing tools and/or profiling tools having a different gear tooth geometry, and wherein the at least two driven tool receivers are shaped and positioned for receiving dressing tools and/or profiling tools for dressing different profile areas of the grinding tool.

7. The dressable grinding tool in accordance with claim 6, wherein the grinding tool has at least two worm grinding wheels, two grinding wheels or two grinding wheel sets on a common tool carrier.

8. The dressable grinding tool in accordance with claim 6, wherein the grinding tool has at least one grinding wheel or at least one grinding wheel set and at least one worm grinding wheel.

9. A dressable grinding tool for processing workpieces, the grinding tool is processed by at least two dressing tools which are mounted on an apparatus for dressing generating grinding tools or profile grinding tools comprising a dressing unit having at least two tool receivers for receiving at least two disk-shaped dressing tools, wherein the tool receivers are arranged such that the dressing tools are individually brought into engagement with the grinding tool without mutually influencing one another, the at least two dressing tools mounted on the apparatus to provide tool areas and/or profile areas of the tool having a defined dressing geometry, wherein at least two areas of the grinding tool are present for processing gear tooth arrangements having a different gear tooth geometry, and wherein the grinding tool has at least two worm grinding wheels, two grinding wheels or two grinding wheel sets on a common tool carrier.

* * * * *